(12) United States Patent
Pera et al.

(10) Patent No.: US 11,784,900 B2
(45) Date of Patent: Oct. 10, 2023

(54) USING WIRELESS PACKETS TO INDICATE DEVICE BOOT STATUS

(71) Applicant: Ubiquiti Inc., Chicago, IL (US)

(72) Inventors: Robert J. Pera, Seattle, WA (US); Yao-Chung Chang, Hsinchu (TW); Andrejs Bogdanovs, Riga (LV)

(73) Assignee: Ubiquiti Inc., Chicago, IL (US)

( * ) Notice: Subject to any disclaimer, the term of this patent is extended or adjusted under 35 U.S.C. 154(b) by 0 days.

(21) Appl. No.: 17/512,925

(22) Filed: Oct. 28, 2021

(65) Prior Publication Data

US 2022/0141106 A1    May 5, 2022

Related U.S. Application Data

(60) Provisional application No. 63/107,060, filed on Oct. 29, 2020.

(51) Int. Cl.
*G06F 15/173* (2006.01)
*H04L 43/0805* (2022.01)
*H04W 4/80* (2018.01)

(52) U.S. Cl.
CPC .......... *H04L 43/0805* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 6,345,294 B1 | 2/2002 | O'Toole et al. | |
| 9,912,556 B1 * | 3/2018 | Hendin | H04L 43/0811 |
| 10,599,521 B2 | 3/2020 | Lambert et al. | |
| 2008/0155245 A1 | 6/2008 | Lipscombe et al. | |
| 2009/0198793 A1 * | 8/2009 | Paul | G06F 11/3055 709/217 |
| 2009/0228734 A1 * | 9/2009 | Kakie | G06F 1/324 713/501 |
| 2011/0055712 A1 * | 3/2011 | Tung | H04L 43/0876 715/741 |
| 2012/0302219 A1 * | 11/2012 | Vang | H04W 4/023 455/414.1 |
| 2016/0210161 A1 * | 7/2016 | Rosset | G06F 9/4408 |

(Continued)

FOREIGN PATENT DOCUMENTS

| | | | | |
|---|---|---|---|---|
| KR | 100452880 B1 * | 10/2004 | | |
| WO | WO-2006047583 A2 * | 5/2006 | ............ | H04L 29/06 |
| WO | 2008085447 A2 | 7/2008 | | |

OTHER PUBLICATIONS

International Application No. PCT/US2021/056984, International Search Report and Written Opinion, dated Feb. 15, 2022.

*Primary Examiner* — Yves Dalencourt
(74) *Attorney, Agent, or Firm* — McDonnell Boehnen Hulbert & Berghoff LLP

(57) ABSTRACT

An example method for using wireless packets to indicate boot status of a network device is disclosed. The method includes initiating a boot sequence of a network device. The method also includes during at least a portion of the boot sequence, transmitting a first wireless packet comprising data indicating a boot status of the network device, wherein the boot status indicates the network device is booting. The method also includes transmitting a second wireless packet comprising data indicating the boot status of the network device, wherein the boot status indicates the network device has finished booting.

20 Claims, 4 Drawing Sheets

(56) References Cited

U.S. PATENT DOCUMENTS

| | | | |
|---|---|---|---|
| 2018/0300202 A1* | 10/2018 | Lambert | G06F 9/4405 |
| 2019/0073276 A1* | 3/2019 | Yuen | G06F 11/302 |
| 2021/0112392 A1* | 4/2021 | Ganick | H04W 4/80 |
| 2021/0133662 A1* | 5/2021 | Balakrishnan | G06Q 10/063114 |
| 2021/0373907 A1* | 12/2021 | Liang | G06F 12/0862 |
| 2022/0282820 A1* | 9/2022 | Tang | F16L 55/48 |
| 2022/0284242 A1* | 9/2022 | Kim | G06F 11/3438 |
| 2022/0284283 A1* | 9/2022 | Yin | G06N 3/08 |

\* cited by examiner

USING WIRELESS PACKETS TO INDICATE DEVICE BOOT STATUS

CROSS-REFERENCE TO RELATED APPLICATION

The present disclosure claims priority to U.S. Provisional Application No. 63/107,060, filed on Oct. 29, 2020, the entire contents of which are herein incorporated by reference.

BACKGROUND

A computer network can include various types of network devices, including but not limited to wireless access points, network switches, and network routers. These devices can be in communication with one another via one or more wireless or wired connections.

When a new network device first powers on, there is a period of time during which the network device is booting, which can be referred to as a "boot sequence." Once the booting sequence has completed, the network device is operational for use in the network and may then become part of the network. During this boot sequence, however, there might not be any visible indication as to whether or when the network device has fully booted or is still performing the boot sequence. Thus, an end user might not be aware of the boot status of the network device.

SUMMARY

In one aspect, a method is described. The method includes initiating a boot sequence of a network device. The method also includes during at least a portion of the boot sequence, transmitting a first wireless packet comprising data indicating a boot status of the network device, wherein the boot status indicates the network device is booting. The method also includes transmitting a second wireless packet comprising data indicating the boot status of the network device, wherein the boot status indicates the network device has finished booting.

In another aspect, a non-transitory computer-readable storage medium, having stored thereon program instructions that, upon execution by a processor of a network device, cause performance of a set of operations is disclosed. The set of operations include initiating a boot sequence of the network device. The set of operations also include during at least a portion of the boot sequence, transmitting a first wireless packet comprising data indicating a boot status of the network device, wherein the boot status indicates the network device is booting. The set of operations also include transmitting a second wireless packet comprising data indicating the boot status of the network device, wherein the boot status indicates the network device has finished booting.

In another aspect, a computing device is disclosed. The computing device includes radio hardware configured to receive, from a network device, (i) a first wireless packet during at least a portion of a boot sequence of the network device and (ii) a second wireless packet. The computing device also includes a processor. The processor is configured to, in response to the radio hardware receiving the first wireless packet, control a user interface to provide a first indication that the network device is currently booting. The processor is also configured to, in response to the radio hardware receiving the second wireless packet, control the user interface to provide a second indication that the network device has finished booting.

Other aspects, embodiments, and implementations will become apparent to those of ordinary skill in the art by reading the following detailed description, with reference where appropriate to the accompanying drawings.

DETAILED DESCRIPTION

Figure 1:
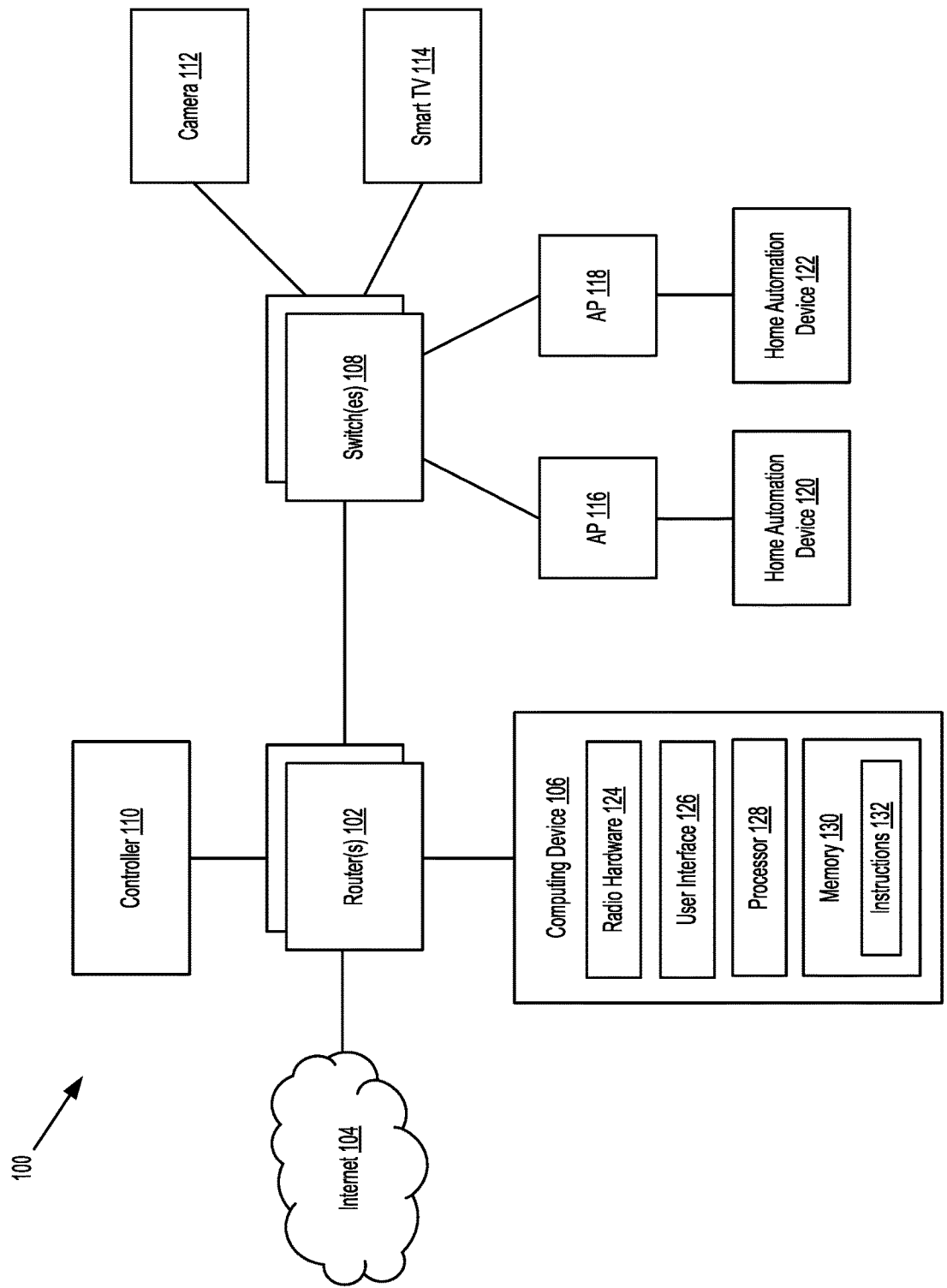
FIG. 1 depicts a simplified block diagram of a computer network, in accordance with an example implementation.

As indicated above, when a network device is powered on, it performs a boot sequence during which there might be no visible indication as to whether or when the network device has fully booted or is still performing the boot sequence, and thus an end user may not be aware of the network device's status.

Accordingly, to improve user experience, the network device can be configured such that, during the boot sequence, the network device broadcasts wireless packets, such as Bluetooth® low energy (BLE) Advertisement packets (also referred to herein as "BLE packets," for brevity), that contain certain types of data, such as an identifier of the network device (e.g., an alphanumeric sequence that identifies the network device), a device registration status (e.g., an indication as to whether the network device has been adopted to work in the network), or other types of data. Additionally, a network controller or client device (e.g. a smartphone or other computing device operated by the end user) can be configured to receive the broadcast packets and responsively provide the end user with an indication of the data contained in the received packets, so as to notify the end user of the boot status of the network device. Thus, when the end user seeks to add a new network device to the network, the network device can quickly inform the end user via the network controller or client device that the network device is in the boot sequence, and thereafter quickly update the end user as to whether the network device is still in the boot sequence or rather the boot sequence has completed.

The wireless packets that the network device broadcasts in accordance with the present methods and systems will be described herein primarily as BLE packets, such as BLE Advertisement packets, although it should be understood that other types of wireless packets or other wireless communication are possible.

An example network may include a network controller and plurality of network devices. The network devices may include wireless access points, network switches, network routers, cameras, and other devices. The network controller can be configured to adopt network devices into the network. A networked device may be adopted into the network when the network device is unprovisioned (i.e., it is brand new or has been factory reset) or is provisioned for a different network. A network device is adopted into the network after the network device has completed the boot sequence (i.e., is fully booted). To adopt a network device into the network, the network controller can verify the authenticity of the network device, allow the authenticated network device to join the network, and provision the network device (e.g., by providing the network device with provision parameters) so that the network device can be used (e.g., operated, or accessed by other devices in the network). The provision parameters may include settings for the network device to operate within the network into which it is being adopted, by way of example. Upon adoption of the device, the network device can operate within the network and may begin broadcasting certain information, such as the network's Service Set Identifier (SSID), relaying network traffic, etc. In some instances, the network may be in communication with a computing device, such as a mobile phone, tablet computer, laptop computer, or other computing device, that can enable a network operator to control network parameters and the adoption of network devices to the network.

FIG. 1 depicts a simplified block diagram of a computer network 100, in accordance with an example implementation. As shown, the network 100 includes one or more routers 102 connected to the Internet 104. Further, a computing device 106 is shown to be connected to the router(s) 102. In addition, the network 100 includes one or more switches 108 connected to various other devices, including a controller 110, a camera 112, a smart television 114, a first access point 116 ("access point" being abbreviated as "AP"), and a second access point 118. The first access point 116 is connected to a first home automation device 120 and the second access point 118 is connected to a second home automation device 122.

Each of the various devices shown in FIG. 1 can be in communication with each other (and thus, the Internet 104) via communication links, which are represented in FIG. 1 as solid lines connecting the various devices. Any given communication link can take the form of any wired connection (e.g., Ethernet) or wireless connection (e.g., 802.11, Bluetooth®) over which devices can engage in communication, such as wired or wireless data communication.

Furthermore, for the purposes of the present disclosure, any of the aforementioned devices can be considered a "network device" that can be adopted into, and thus included as part of, the network 100. Moreover, the network 100 is one example implementation of a network. Other configurations are possible as well.

The router(s) 102 can be or include networking equipment configured to facilitate external communication between other network devices of the network 100 and the Internet 104, as well as to facilitate internal communication between such network devices with each other. By way of example, the router(s) 102 can be or include one or more packet-switching devices and/or routing devices (including switches and/or gateways, for instance). One or more of the router(s) 102 may include a Dynamic Host Configuration Protocol (DHCP) server configured to supply and/or assign IP addresses to the devices of the network.

The computing device 106 can take the form of a client device (e.g., a computing device that is actively operated by an end user), a server, cloud computing device, a dedicated console device (e.g., the controller 110) that hosts a network controller application, or some other type of computational platform. In some examples, the computing device 106 can take the form of a desktop computer, laptop computer, tablet computer, smartphone, smart television, wearable computing device (e.g., smartwatch or AR glasses), or other type of device. In other examples, the computing device 106 can be integrated with, or take the form of, one of the other devices shown in FIG. 1, such as one of the router(s) 102 or one of the access points. As noted above, the computing device 106 can be in communication with one or more other devices shown in FIG. 1. For example, the computing device 106 can receive wireless packets such as BLE packets from a network device of the computer network 100, such as AP 116, AP 118, camera 112, Smart TV 114, etc.

As shown, the computing device 106 includes radio hardware 124, a user interface 126, a processor 128, and memory 130 storing instructions 132.

The radio hardware 124 can be or include one or more receivers or transceivers and associated circuitry, as well as an interface for communicating with the processor 128. The radio hardware 124 can be configured to engage in communication in the radio frequency spectrum. Within examples, the radio hardware 124 can be or include a Bluetooth® module configured to receive BLE packets, as well as an 802.11 Wi-Fi module configured to facilitate network communication with one or more other network devices in the network 100.

The user interface 126 can be or include one or more devices that facilitate end user interaction with the computing device 106 or otherwise function to communicate information to an end user. For example, the user interface 126 can be or include one or more types of input devices, such as a keyboard, a mouse, a touch screen, and so on. Similarly, the user interface 126 can be or include one or more types of output devices, such as a screen, monitor, speaker, one or more light emitting diodes (LEDs), one or more electromechanical device (e.g., vibration motor) that converts electrical signals into mechanical vibrations (e.g., for the purposes of haptic feedback), and so on.

The processor 128 can be a general-purpose processor or special purpose processor (e.g., a digital signal processor, application specific integrated circuit, etc.). The processor 128 is configured to execute the instructions 132 (e.g., computer-readable program instructions including computer executable code) that are stored in the memory 130 and are executable to provide various operations described herein. In alternative examples, the computing device 106 can include additional processors that are configured in the same manner. At least some of the operations described herein as being performed by the computing device 106 can be performed by the processor 128.

The memory 130 can take the form of one or more computer-readable storage media that can be read or accessed by the processor 128. The computer-readable storage media can include volatile and/or non-volatile storage components, such as optical, magnetic, organic or other memory or disc storage, which can be integrated in whole or in part with the processor 128. The memory 130 is considered non-transitory computer readable media. In some examples, the memory 130 can be implemented using a single physical device (e.g., one optical, magnetic, organic or other memory or disc storage unit), while in other examples, the memory 130 can be implemented using two or more physical devices.

The switch(es) 108 can be or include networking equipment configured to facilitate internal communication between network devices that are connected to each other by way of the switch(es) 108.

The controller 110 can be a network controller application configured to control various operational aspects of the network 100. As previously discussed, a function of the network controller application can be to adopt network devices into the network 100 by providing operational parameters to various network devices. The controller 110 also can display a graphical user interface (GUI) on a display of a computing device in communication with the controller 110, such as the computing device 106 or another type of network device that includes a display. In some examples, the controller 110 includes a web server that when accessed allows a user to modify network parameters. In response to network parameters being modified within a user interface of the controller 110, the controller 110 may push parameter data to respective network devices to control their operation.

The controller 110 can be or include software running on a general-purpose computer or server. In some examples, the controller 110 might not always be present in the network 100. The controller 110 can be connected to, or otherwise accessed for use by, the network 100 when a change is being made to the network 100, such as the adoption of a new device. In other examples, controller 110 can be software operating on a dedicated console device that hosts a network controller application. The dedicated console device may include network routing functioning, such as one of router(s) 102.

Camera 112 can be or include an imaging device configured to capture images and transmit such images to one or more other network devices in the network 100 and outside of the network 100. For example, camera 112 can be a security camera installed in an end user's home or place of business. Other examples are possible as well.

Smart TV 114 can be or include a television set configured to access the Internet 104 and present various forms of media content to end users, such as videos, movies, TV shows, photos, and/or other content from various sources such as cable or satellite channels, streaming media services (e.g., by way of one or more streaming media software applications installed on the Smart TV 114), or local storage. Smart TV 114 may also include other network-connected displays that are not necessarily televisions, such as LCD screens.

AP 116 and AP 118 can each be or include networking equipment that is configured to help connect other network devices, such as the first home automation device 120, the second home automation device 122, and/or other Wi-Fi-enabled devices, to the network 100. To facilitate this, for example, each such AP can have a wired connection to the switch(es) 108 (and, in turn, a connection to the router(s) 102). In some cases, one or both APs could be integrated with the router(s) 102. Additionally, one or both APs can alternatively have a wireless connection to the switch(es) 108 (and, in turn, a connection to the router(s) 102) by way of a wireless connection to another AP.

The first home automation device 120 and the second home automation device 122 can be or include Wi-Fi-enabled and/or Bluetooth-enabled devices configured to connect to the network 100 via AP 116 and AP 118, respectively. Each such home automation device can take the form of a device configured to monitor and/or control attributes of an end user's home or place of business, such as lighting, temperature, security, and media devices. As such, examples of home automation devices can include smart switches (e.g., for water pumps, inside or outside lighting, etc.), smart locks (e.g., for doors, safes, etc.), smart thermostats, smart garage door openers, smart doorbells, cameras, motion sensors, and so on.

Although not explicitly shown in FIG. 1, other network devices can be included in the network 100 as well, additionally or alternatively to those discussed above. By way of example, such network devices can include one or more gateways, one or more digital/streaming media presentation devices that can be integrated with or connected to a television or other display device, video game consoles, printers, and so on, any one or more of which could also be equipped with home automation functionality.

Figure 2:
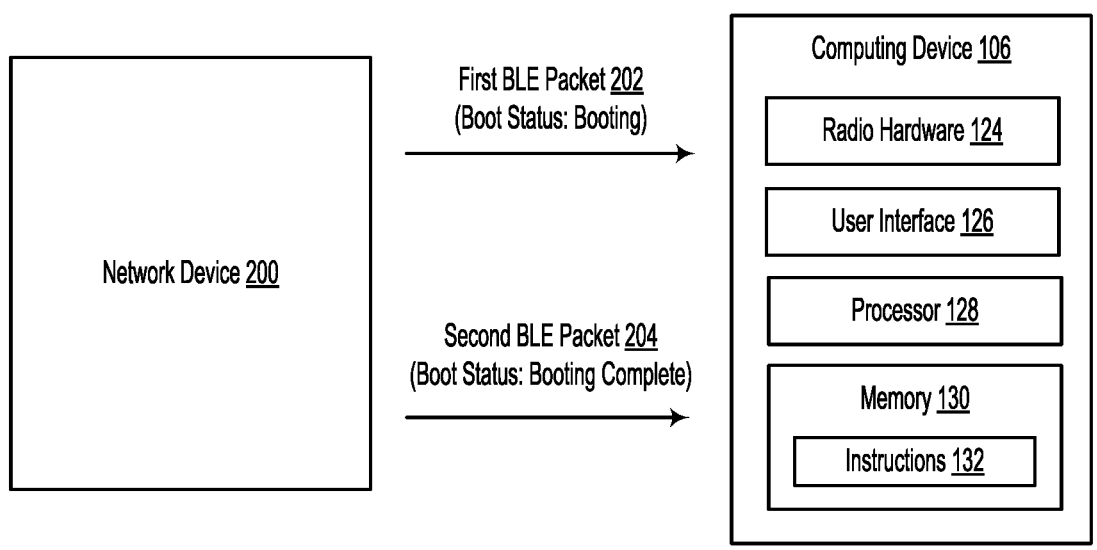
FIG. 2 depicts communication of wireless packets from a network device to a computing device, in accordance with an example implementation.

FIG. 2 depicts communication of wireless packets from a network device 200 to the computing device 106, in accordance with an example implementation. In line with the discussion above, the network device 200 can take various forms, such as AP 116, AP 118, one of switch(es) 108, one of router(s) 102, the first home automation device 120, the second home automation device 122, camera 112, smart TV 114, or other type of network device.

When the network device 200 powers on, the network device 200 initiates a boot sequence. This can occur when the network device 200 is a new device that is powering on for the first time before being adopted. Alternatively, this can occur when the network device 200 is an existing device that was previously adopted by the network 100 (or adopted by another network) and is powering on and booting again. In either situation, while performing the boot sequence, the network device 200 is not operational as a part of the network 100 (not shown in FIG. 2). Once the boot sequence is completed for the network device 200, the network device 200 can be an operational part of the network 100.

Generally, when an electronic device (e.g., network device 200) is powered down, a volatile memory (i.e. Random Access Memory (RAM)) can lose its contents. When the electronic device is powered for the first time or is powered on after having been previously provisioned in a network and powered off, a bootloader application can then run a boot sequence to load an operating system and/or other programs into the volatile memory of the electronic device. As part of the present disclosure, the boot sequence can include the disclosed transmission of BLE packets.

Upon the bootloader initiating the boot sequence for the network device 200, the network device 200 can begin broadcasting BLE packets at the instruction of the bootloader—that is, based on instructions executed by the bootloader. These BLE packets, which can be received by the computing device 106, can include data that indicate a boot status of the network device 200. Upon receipt of the BLE packets, the computing device 106 can responsively provide an indication of the boot status to an end user.

In particular, during at least a portion of the boot sequence, the network device 200 can transmit a first BLE packet 202 including data indicating that the network device 200 is currently booting. And in response to the radio hardware 124 of the computing device 106 receiving the first BLE packet 202 from the network device 200, the computing device 106 can control the user interface 126 to provide a first indication that the network device 200 is currently booting. As discussed above, the computing device 106 can be or include a mobile phone, the controller 110, access point, or other computing device, and the user interface 126 include a touch screen, speaker, vibration motor, or other output device.

Similarly, the network device 200 can transmit a second BLE packet 204 including data indicating that the network device 200 has finished booting. And in response to the radio hardware 124 of the computing device 106 receiving the second BLE packet 204 from the network device 200, the computing device 106 can control the user interface to provide a second indication that the network device 200 has finished booting.

Additionally or alternatively, in response to receiving BLE packets as described above, the computing device 106 can control a user interface of another computing device, different from the computing device 106, to provide indications of the boot status of the network device 200.

As an example, the computing device 106 can be the controller 110. As such, the controller 110 can receive a given BLE packet from the network device 200, determine the boot status from the received BLE packet, and transmit the notification of the boot status to a mobile device (e.g., a mobile phone or laptop of the end user). And upon receiving the notification, the mobile device can be configured to responsively display, or otherwise provide via its own user interface, an indication of the boot status.

As another example, the computing device 106 can be AP 116 and the network device 200 can be AP 118. As such, AP 116 can receive a given BLE packet from AP 118, determine the boot status from the received BLE packet, and transmit the notification of the boot status to the controller 110. And upon receiving the notification, the controller 110 can be configured to responsively display, or otherwise provide via its own user interface, an indication of the boot status and/or push a notification of the boot status to a mobile device, whereupon the mobile device then provides an indication of the boot status via its own user interface. Other examples are possible as well.

The indication that the user interface 126 of the computing device 106 or other user interface provides can take the form of a visual indication, for instance, such as a text message notification, or a progress bar representative of how far along the network device 200 is in the boot sequence. Additionally, the indication that the user interface 126 of the computing device 106 or other user interface provides can take the form of a prompt to adopt the booted network device 200 into the network 100.

Other indications of the boot status of the network device 200 are possible as well, such as haptic or audio feedback. Haptic feedback can take the form of a vibration of the computing device 106 or other computing device, for instance. By way of example, the computing device 106 can be configured to vibrate according to a first vibration pattern (e.g., two half-second bursts of vibration) when the boot status indicates that the network device 200 is still booting, and according to a second vibration pattern (e.g., one two-second burst of vibration) when the boot status indicates that the network device 200 has fully booted. Audio feedback can take the form of a beep, tone, or spoken message, for instance. By way of example, the computing device 106 can be configured to output, via a speaker, a first tone (e.g., a low frequency tone) and/or a first spoken message (e.g., "The network device is booting") when the boot status indicates that the network device 200 is still booting, and a second time (e.g., a high frequency tone) and/or a second spoken message (e.g., "The network device has finished booting") when the boot status indicates that the network device 200 has fully booted. Other examples are possible as well.

In some examples, the computing device can be configured such that, during the boot sequence and at predefined intervals (e.g., every three seconds, or in response to receiving each BLE packet), the computing device will provide audio, visual, and/or haptic feedback via one or more speakers, display devices, and/or vibration motors, respectively. Upon completion of the boot sequence, the computing device might discontinue providing the audio, visual, and/or haptic feedback, or might provide an alternative form of audio, visual, and/or haptic feedback. As a specific example, the computing device might periodically vibrate in a particular pattern during the boot sequence and then vibrate in another, different pattern once the boot sequence is complete. For example, the computing device might periodically prompt to adopt the now-booted network device 200 into the network. Other examples are possible as well.

The structure and size of a particular one of the BLE packets can vary, and any particular one of the BLE packets can include other types of data as well, other than data indicating a boot status of the network device 200. Any one or more of the BLE packets that the network device 200 broadcasts can include, for example, (i) one or more universally unique identifiers (UUIDs), (ii) an IP address, (iii) network device uptime (e.g., time since boot, in seconds), (iv) a boot status (e.g., booting, or fully booted), (v) a firmware version, (vi) a MAC address, (vii) an indication that the BLE packet is from a discoverable device, (viii) a stock keeping unit (SKU) code, and/or (ix) a model name for the network device 200, among other possible information. One example of the information that can be included in a BLE packet is shown in Table 1 below. In various different examples, the data contained within a BLE packet may be different than that shown in Table 1.

TABLE 1

| AD Type | Data | Description |
| --- | --- | --- |
| 0x1 | [Discovery Flag] | Flag indicating the network device 200 is discoverable |
| 0x6 | [Configured UUID] | Configured UUID means this network device 200 is already adopted into a network. |
|  | [Unconfigured UUID] | Unconfigured UUID means this network device 200 is NOT yet adopted with into a network. |
| 0x8 | [Shorted local name] | An identification of the network device 200 model |
| 0x16 | [Device boot status] | 0x0 - the network device 200 is booting<br>0x1 - the network device 200 is up (kernel mode) |
| 0x16 | [MAC address] | The MAC address of the network device 200 |
| 0x16 | [Device Uptime] | The length of time since the network device 200 was powered on |

In the context of the present invention, a UUID is unique for a given model of a network device product. In some examples, there can be two UUIDs for a particular network device, one for an unadopted unit and another for an adopted unit. As such, any particular one of the BLE packets can include data indicating an adoption status of the network device 200.

In one specific example, a BLE packet can include a 16-byte first universally unique identifier (UUID), as well as a 2-byte second UUID (e.g., a service UUID). Thus, when a BLE packet is received by the computing device 106 and/or the controller 110, the computing device 106 and/or the controller 110 will be able to inform the end user whether or not the new network device 200 has already been adopted as part of a network, before the network device 200 finished its boot sequence. In some examples, rather than transmitting a UUID, the network device 200 may transmit a binary indication of whether the network device 200 is adopted or not. Further, in some examples, once a network device 200 has finished booting, the network device 200 and/or the network controller may determine if the network device 200 has been adopted into the network to which the network device 200 is attached. If the network device 200 was adopted to a different network, a user may be prompted to adopt the network device 200 into the current network.

In some examples, the network device 200 can be configured to perform the above-described operations in response to the network device 200 detecting that it has been plugged in. As a specific example, the network device 200 can be a network switch configured in this way.

In further examples, and as an alternative to broadcasting BLE packets to convey boot status, the network device 200 can be configured to create an SSID that indicates the boot status, and then broadcast the SSID, such as over Wi-Fi and in packets including a field for the SSID. The computing device 106, such as a mobile phone or an access point, can then receive the SSID and responsively provide indications of the boot status in one or more of the manners described above. This can be useful in situations where the network device 200 does not have built-in Bluetooth® capabilities.

In particular, during a portion of the boot sequence, the network device 200 can generate and broadcast a first SSID that includes an indicator that the network device 200 is currently booting. Then, when the boot sequence is complete, the network device 200 can generate and broadcast a second SSID, different from the first, that includes an indicator that the network device 200 is finished booting. For example, consider a scenario where AP 116 powers on and initiates the boot sequence. During the boot sequence, AP 116 can create and broadcast an SSID such as "[AP 116] [MAC ADDRESS] [BOOTING]". Then, when the boot sequence is complete, the network device 200 can generate and broadcast a different SSID, such as "AP 116 [MAC ADDRESS] [BOOT COMPLETE]". Other examples are possible as well.

Figure 5:
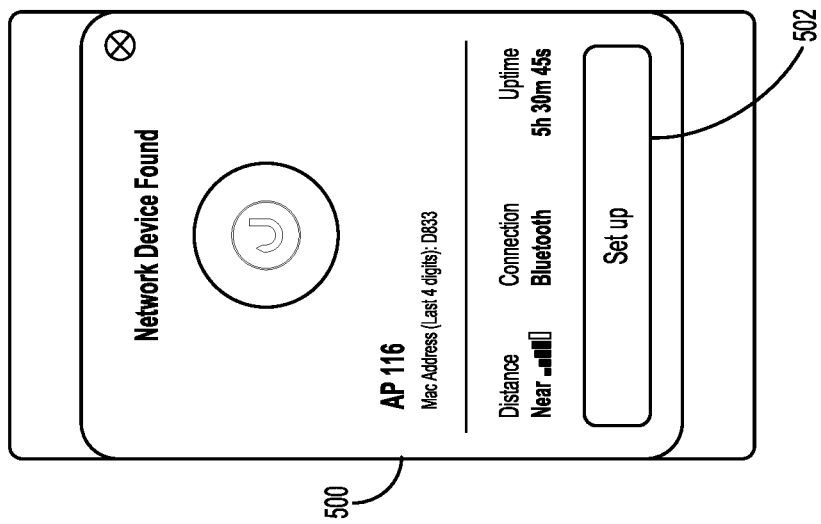
FIG. 5 depicts another display that can be provided to an end user via a user interface of a computing device, so as to notify the end user of the boot status of a network device, in accordance with an example implementation.
Figure 4:
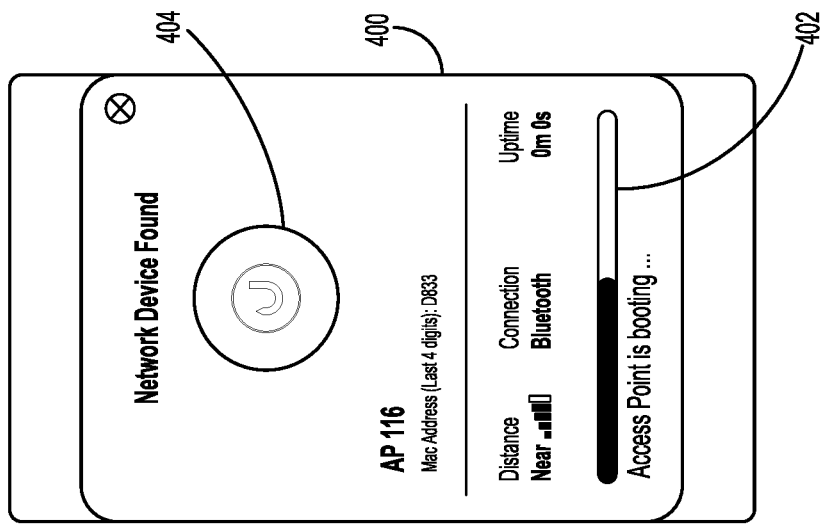
FIG. 4 depicts another display that can be provided to an end user via a user interface of a computing device, so as to notify the end user of the boot status of a network device, in accordance with an example implementation.
Figure 3:
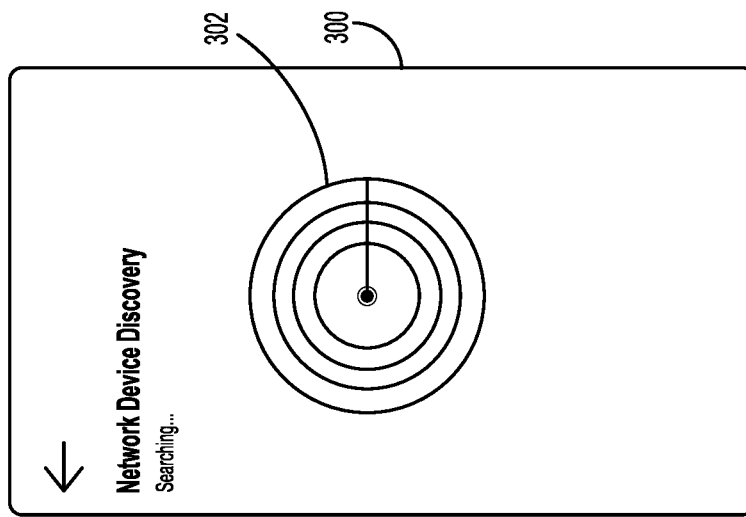
FIG. 3 depicts a display that can be provided to an end user via a user interface of a computing device, so as to notify the end user of the boot status of a network device, in accordance with an example implementation.

FIGS. 3-5 depict example displays that can be provided to an end user by the user interface 126 of the computing device 106, or by a respective user interface of another computing device, to notify the end user as to the boot status of the network device 200. In an example, a software application associated with the network device 200 can be configured for use in viewing the boot status of the network device 200 and can thus provide the displays.

FIG. 3 depicts a display 300 indicating that the controller 110 or computing device 106 is searching for the network device 200. As such, the display 300 can include an animated graphic 302 indicating that the search is being performed. Display 300 may be shown to a user when the user attempts to add a new network device to the network 100, such as network device 200.

FIG. 4 depicts a display 400 indicating that the network device 200 has been found and is booting. The display also provides various information for the network device 200 (e.g., a name, MAC address, distance, uptime, and boot status). In particular, the boot status is displayed using a progress bar 402. The display 400 can also include a graphic 404 of the network device 200. In some examples, the display 400 can be updated with additional information and an updated progress bar as additional BLE packets are broadcast and received.

FIG. 4 may be shown when a network device is found when a user attempts to add a new network device to the network 100. In other examples, FIG. 4 may be shown in response to a device receiving a notification that a network device is booting, that is —FIG. 4 may be shown without a user initiating a search for a new network device.

FIG. 5 depicts a display 500 indicating that the boot sequence is complete and that the network device 200 is ready to be set up. In particular, the progress bar 402 of FIG. 4 is replaced with a selectable GUI element 502 that, when selected, can initiate for the end user a process for setting up (i.e., adopting into the network) the now-booted network device 200. Further, the runtime shown in the display 500 of FIG. 5 is an updated version of the runtime shown in the display 400 of FIG. 4.

Figure 6:
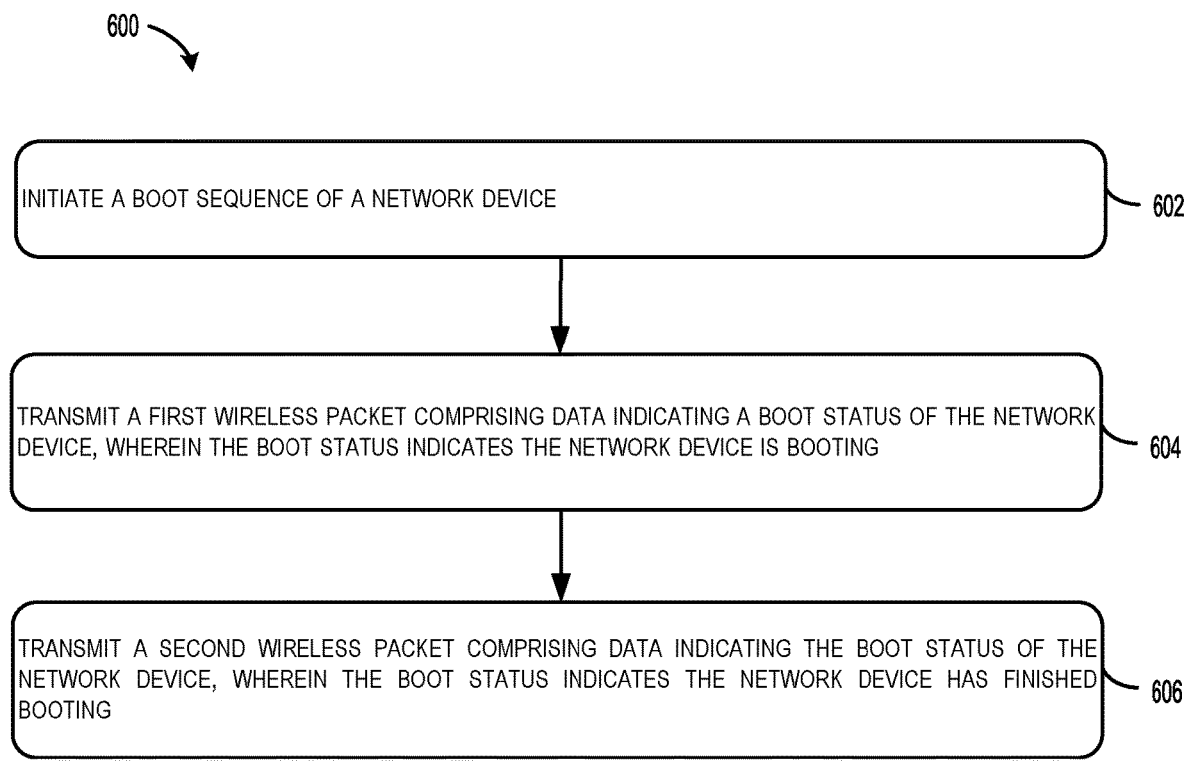
FIG. 6 depicts a flowchart of a method, in accordance with an example implementation.

FIG. 6 shows a flowchart of an example method 600. At block 602, the method 600 includes initiating a boot sequence of a network device.

At block 604, the method 600 includes during at least a portion of the boot sequence, transmitting a first wireless packet comprising data indicating a boot status of the network device, wherein the boot status indicates the network device is booting.

At block 606, the method 600 includes transmitting a second wireless packet comprising data indicating the boot status of the network device, wherein the boot status indicates the network device has finished booting.

In some embodiments, the act of transmitting the first wireless packet involves transmitting a first wireless packet comprising data indicating an adoption status of the network device.

In some embodiments, the act of transmitting the first wireless packet involves transmitting a first wireless packet comprising data indicating an uptime status of the network device.

In some embodiments, the act of transmitting the first wireless packet involves transmitting the first wireless packet based on instructions executed by a bootloader of the network device.

In some embodiments, both the first wireless packet and the second wireless packet are BLE Advertisement packets.

In some embodiments, the network device is a wireless access point.

In other embodiments, the network device is a network switch.

In still other embodiments, the network device is a camera.

In still other embodiments, the network device is a router.

In still other embodiments, the network device is a home automation device.

Devices or systems can be used or configured to perform logical functions presented in FIG. 6. In some instances, components of the devices and/or systems can be configured to perform the functions such that the components are actually configured and structured (with hardware and/or software) to enable such performance. In other examples, components of the devices and/or systems can be arranged to be adapted to, capable of, or suited for performing the functions, such as when operated in a specific manner. Although blocks in FIG. 6 are illustrated in a sequential order, these blocks can also be performed in parallel, and/or in a different order than those described herein. Also, the various blocks can be combined into fewer blocks, divided into additional blocks, and/or removed based upon the desired implementation.

It should be understood that for these and other processes and methods disclosed herein, flowcharts show functionality and operation of one possible implementation of present examples. In this regard, each block or portions of each block can represent a module, a segment, or a portion of program code, which includes one or more instructions executable by a processor for implementing specific logical functions or steps in the process. The program code can be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium can include non-transitory computer readable medium or memory, for example, such as computer-readable media that stores data for short periods of time like register memory, processor cache and RAM. The computer readable medium can also include non-transitory media, such as secondary or persistent long term storage, like read only memory (ROM), optical or magnetic disks, compact-disc read only memory (CD-ROM), for example. The computer readable media can also be any other volatile or non-volatile storage systems. The computer readable medium can be considered a tangible computer readable storage medium, for example.

In addition, each block or portions of each block in FIG. 6 can represent circuitry that is wired to perform the specific logical functions in the process. Alternative implementations are included within the scope of the examples of the present disclosure in which functions can be executed out of order from that shown or discussed, including substantially concurrent or in reverse order, depending on the functionality involved, as would be understood by those reasonably skilled in the art.

The description of the different advantageous arrangements has been presented for purposes of illustration and description, and is not intended to be exhaustive or limited to the examples in the form disclosed. Many modifications and variations will be apparent to those of ordinary skill in the art. It should be understood that other embodiments can include more or less of each element shown in a given Figure. Further, some of the illustrated elements can be combined or omitted. Yet further, an illustrative embodiment can include elements that are not illustrated in the Figures.

What is claimed is:

1. A method performed by a processor of a network device, the method comprising:
   initiating a boot sequence of the network device;
   during at least a portion of the boot sequence, transmitting, to a computing device, a first wireless packet comprising data indicating a first boot status of the network device, wherein the first boot status indicates the network device is booting and enables the computing device to output a first haptic or audio feedback, and wherein while performing the boot sequence, the network device is not operational for use as part of a network; and
   transmitting, to the computing device, a second wireless packet comprising data indicating a second boot status of the network device, wherein both the first wireless packet and the second wireless packet are Bluetooth® low energy (BLE) Advertisement packets, wherein the second boot status indicates the network device has finished booting and enables the computing device to output a second haptic or audio feedback, wherein the second haptic or audio feedback differs from the first haptic or audio feedback, and wherein the network device is operational for use as part of the network as a result of the boot sequence being completed.

2. The method of claim 1, wherein transmitting the first wireless packet comprises transmitting a first wireless packet comprising data indicating an adoption status of the network device.

3. The method of claim 1, wherein transmitting the first wireless packet comprises transmitting a first wireless packet comprising data indicating an uptime status of the network device.

4. The method of claim 1, wherein transmitting the first wireless packet comprises transmitting the first wireless packet based on instructions executed by a bootloader of the network device.

5. The method of claim 1, wherein the network device is a wireless access point.

6. The method of claim 1, wherein the network device is a network switch.

7. The method of claim 1, wherein the network device is a camera.

8. The method of claim 1, wherein the network device is a router.

9. The method of claim 1, wherein the network device is a home automation device.

10. The method of claim 1, wherein the first haptic or audio feedback comprises a first spoken message and the second haptic or audio feedback comprises a second spoken message.

11. The method of claim 1, wherein the first haptic or audio feedback comprises a first vibration pattern and the second haptic or audio feedback comprises a second vibration pattern.

12. A non-transitory computer-readable storage medium, having stored thereon program instructions that, upon execution by a processor of a network device, cause performance of a set of operations comprising:
    initiating a boot sequence of the network device;
    during at least a portion of the boot sequence, transmitting, to a computing device, a first wireless packet comprising data indicating a first boot status of the network device, wherein the first boot status indicates the network device is booting and enables the computing device to output a first haptic or audio feedback, and wherein while performing the boot sequence, the network device is not operational for use as part of a network; and
    transmitting, to the computing device, a second wireless packet comprising data indicating a second boot status of the network device, wherein both the first wireless packet and the second wireless packet are Bluetooth® low energy (BLE) Advertisement packets, wherein the second boot status indicates the network device has finished booting and enables the computing device to output a second haptic or audio feedback, wherein the second haptic or audio feedback differs from the first haptic or audio feedback, and wherein the network device is operational for use as part of the network as a result of the boot sequence being completed.

13. The non-transitory computer-readable storage medium of claim 12, wherein transmitting the first wireless packet comprises transmitting a first wireless packet comprising data indicating an adoption status of the network device.

14. The non-transitory computer-readable storage medium of claim 12, wherein transmitting the first wireless packet comprises transmitting a first wireless packet comprising data indicating an uptime status of the network device.

15. The non-transitory computer-readable storage medium of claim 12, wherein transmitting the first wireless packet comprises transmitting the first wireless packet based on instructions executed by a bootloader of the network device.

16. The non-transitory computer-readable storage medium of claim 12, wherein the network device is selected from the group consisting of: a wireless access point, a network switch, a camera, a router, and a home automation device.

17. A computing device comprising:
  radio hardware configured to receive, from a network device, (i) a first wireless packet during at least a portion of a boot sequence of the network device and (ii) a second wireless packet, wherein each wireless packet is a Bluetooth® low energy (BLE) Advertisement packet comprising respective data indicating a boot status of the network device;
  a processor configured to:
    in response to the radio hardware receiving the first wireless packet, control a user interface to provide a first indication that the network device is currently booting, wherein the first indication includes a first haptic or audio feedback; and
    in response to the radio hardware receiving the second wireless packet, control the user interface to provide a second indication that the network device has finished booting, wherein the second indication includes a second haptic or audio feedback, and wherein the second haptic or audio feedback differs from the first haptic or audio feedback.

18. The computing device of claim 17, wherein the computing device further comprises the user interface.

19. The computing device of claim 17, wherein controlling the user interface to provide a first indication that the network device is currently booting comprises transmitting, to a mobile device, a first notification that the network device is currently booting, wherein the mobile device is configured to receive the first notification and responsively display, on a user interface of the mobile device, a first visual indication that the network device is currently booting, and
  wherein controlling the user interface to provide a second indication that the network device has finished booting comprises transmitting, to the mobile device, a second notification that the network device has finished booting, wherein the mobile device is configured to receive the second notification and responsively display, on the user interface of the mobile device, a second visual indication that the network device has finished booting.

20. The computing device of claim 17, wherein the computing device is a wireless access point, and
  wherein the user interface is a user interface of a mobile device, different from the computing device.

* * * * *